(12) United States Patent
Saeijs et al.

(10) Patent No.: US 6,871,007 B1
(45) Date of Patent: Mar. 22, 2005

(54) SIGNAL PROCESSING ON INFORMATION FILES SO AS TO OBTAIN CHARACTERISTIC POINT INFORMATION SEQUENCES

(75) Inventors: Ronald W. J. J. Saeijs, Eindhoven (NL); Fre J. Jorritsma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/436,199

(22) Filed: Nov. 8, 1999

(30) Foreign Application Priority Data

Nov. 6, 1998 (EP) .............................................. 98203740

(51) Int. Cl.[7] .................................................. H04N 5/91
(52) U.S. Cl. ........................ 386/95; 386/111; 386/112
(58) Field of Search ............................. 386/46, 95, 98, 386/111, 112, 125, 126

(56) References Cited

U.S. PATENT DOCUMENTS 5,809,331 A * 9/1998 Staats et al. ................... 710/10
2002/0191960 A1 * 12/2002 Fujinami et al. .............. 386/95

* cited by examiner

*Primary Examiner*—Huy Nguyen
(74) *Attorney, Agent, or Firm*—Edward W. Goodman

(57) ABSTRACT

An apparatus for recording a digital information signal in the form of an information file on a record carrier includes input apparatus for receiving the digital information signal, processing apparatus for processing the digital information signal into an information file, and writing apparatus for writing the information file on the record carrier in sections having a predetermined memory size. The apparatus further includes apparatus for generating characteristic point information (CPI) for inclusion in a CPI sequence. The characteristic point information identifies a characteristic point in the information file. The CPI sequence is formatted and CPI information for several CPI sequences is shared.

8 Claims, 4 Drawing Sheets

Point with no point_data. (e.g. I_end, P1_end)

FIG. 2c

Point with 4 bytes of point_data. (e.g. I_start, A_start)

FIG. 2d

Point with 7 bytes of point_data.

SIGNAL PROCESSING ON INFORMATION FILES SO AS TO OBTAIN CHARACTERISTIC POINT INFORMATION SEQUENCES

FIELD OF THE INVENTION

The invention relates to the field of digital information formatting and more specifically formatig of video clips.

BACKGROUND OF THE INVENTION

The invention relates to an apparatus for recording a digital information signal in the form of an information file on a record carrier, the apparatus including:
input apparatus for receiving the digital information signal,
processing apparatus for processing the digital information signal into an information file, and
writing apparatus for writing the information file on the record carrier. The invention also relates to an apparatus for editing a first information file recorded on a record carrier so as to obtain a second information file, the apparatus including:
input apparatus for receiving edit commands from a user, and
processing apparatus for generating the second information file sharing at least a portion of the first information file in response to the commands from the user,
the first information file being accompanied by a first characteristic point information (CPI) sequence recorded on the record carrier, the characteristic point information in the CPI sequence identifying a characteristic point in the first information file. The invention also relates to an apparatus for processing a digital information signal stored in the form of an information file in a memory, such as a record carrier, to corresponding methods and to a record carrier. An apparatus as defined in the opening paragraph has been described in U.S. patent application Ser. No. 09/266,329 filed Mar. 11, 1999 by Ronald Saeijs et al.

The patent application identified above, describes recording and reproduction of an information signal on a new optical recording medium, called DVR. Further, editing of the information signal has also been described.

The above references are hereby incorporated in whole by reference.

SUMMARY OF THE INVENTION

The invention herein aims at defining the general format of Characteristic Point Information (CPI) as well as defining measures to use such CPI. CPI is the general name for information that is used to represent so-called characteristic points in clips (or information files). These characteristic points correspond to the locations of particular data elements in the clip files. For example, for clips that contain video stream data, characteristic points are used to indicate the start or the end of certain video access units. In general, the specification of characteristic points for a stream depends on the type and the contents of the stream.

In a first aspect of the invention, in the apparatus as defined in the opening paragraph the information file has been built up of a sequence of sections of information, a section comprising a fixed size portion of information of the information file, the apparatus further includes:
apparatus for generating characteristic point information, the characteristic point information identifying a characteristic point in the information file,
apparatus for processing the characteristic point information for a plurality of characteristic points into a characteristic point information (CPI) sequence, and
apparatus for recording the characteristic point information sequence on the record carrier. In this first aspect of the invention,
the characteristic point information sequence including, for a characteristic point a block of information, the block of information including section offset information, identifying the position of the characteristic point in the section of the information file in which the characteristic point is located. Defining the position of a characteristic point in a section by its section offset, which is the distance from the point to the beginning of the section, improves the accessability of the point and makes the sharing of CPI information possible, compared to a situation where the offset is defined as the distance between the point and the beg of the file.

In a second aspect of the invention, in the apparatus as defined in the opening paragraph the apparatus further includes:
apparatus for attributing section numbers to sections of the information file, a section comprising a fixed portion of information of the information file,
apparatus for generating characteristic point information, the characteristic point information identifying a characteristic point in the information file,
apparatus for processing the characteristic point information for a plurality of characteristic points into a characteristic point information (CPI) sequence, and
apparatus for recording the characteristic point information sequence on the record carrier. In this second aspect of the invention,
the characteristic point information sequence includes blocks of information, a block of information being available in the CPI sequence for at least those sections containing a characteristic point, the block of information including section number information, identifying the section number of the section.

In a third aspect of the invention, the apparatus is for editing a first information file recorded on a record carrier so as to obtain a second information file, the apparatus includes:
input apparatus for receiving edit commands from a user, and
processing apparatus for generating the second information file sharing at least a portion of the first information file in response to the commands from the user. In this third aspect of the invention, the first information file is accompanied by a first characteristic point information (CPI) sequence recorded on the record carrier, the characteristic point information in the CPI sequence identifying a characteristic point in the first information file, the apparatus further includes apparatus for generating a second CPI sequence for the second information file. The first and second CPI sequences share the characteristic point information of at least some of the characteristic points located in that portion of the first information file that the first and second information files have in common. Sharing the information in CPI sequences has the advantage that less memory space is required for storing the CPI information.

Those skilled in the art will understand the invention and additional objects and advantages of the invention by studying the description of preferred embodiments below with reference to the following drawings which illustrate the features of the appended claims:

DETAILED DESCRIPTION OF THE PREFERRED EMBODIMENT

In order to explain the feature of CPI, first a short description will be given of what is meant by a clip, such clips being described in U.S. patent application Ser. No. 09/326,031 filed Jun. 9, 1999 by Saeijs et al. which is hereby incorporated in whole by reference.

The following description considers in particular A/V devices operating according to the MPEG standards (ISO/EC 11172 for MPEG-1, and ISO/EC 13818 for MPEG-2) which is hereby incorporated in whole by reference. Those skilled in the art will recognize the applicability of the preset invention to other A/V coding schemes not in conformance with the MPEG standard.

Figure 1:
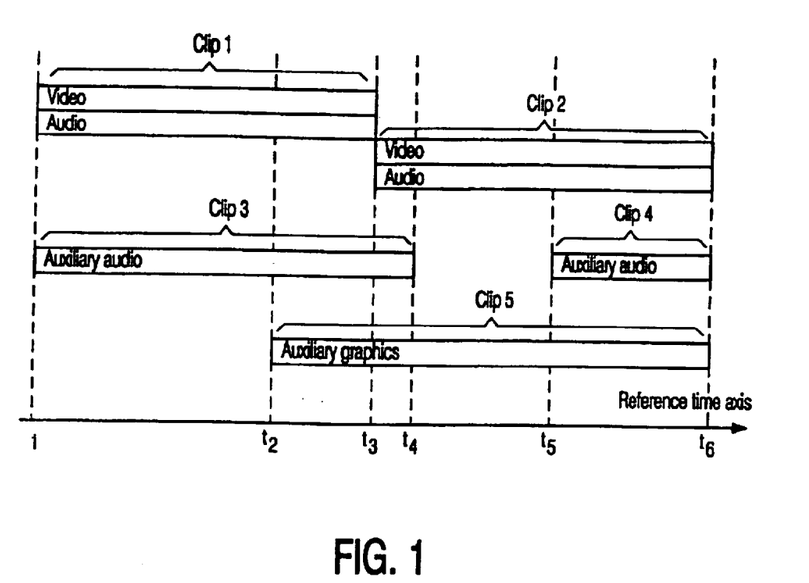
FIG. 1 shows an example of information files (clips)
Figure 2A:
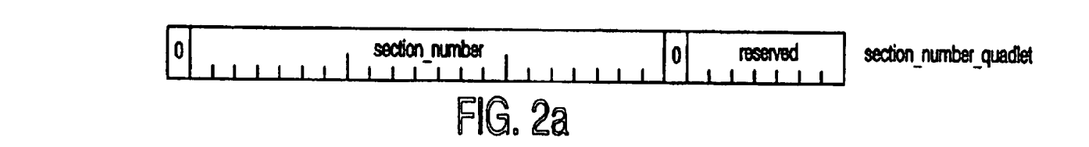
FIG. 2 shows the format of a CPI sequence.
Figure 2B:
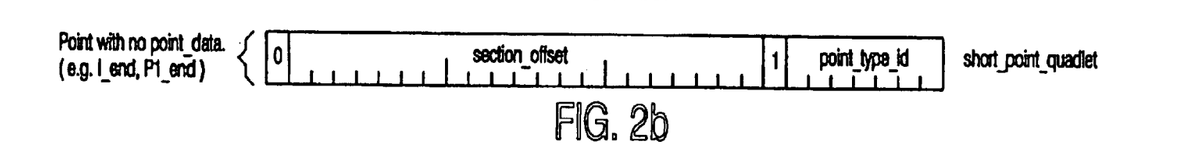
Figure 2C:
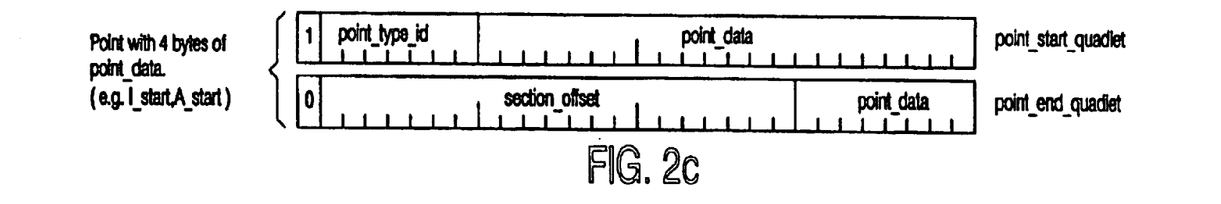
Figure 2D:
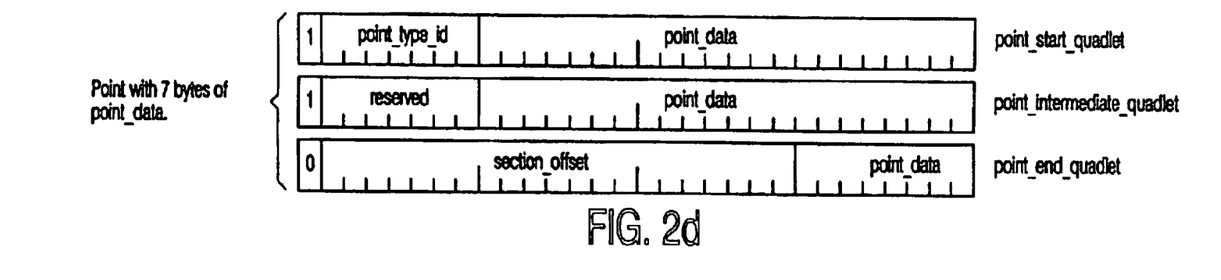

Reference is made to FIG. 1.

A clip is a portion of a multiplexed stream. The multiplexed stream of which it is a portion complies with its defining specification in all respects (for example in the case of an MPEG-2 multiplexed stream it complies with the MPEG-2 Program Stream specification). A clip begins with the data that must be fetched in order to start decoding correctly. Decoding of some elementary streams in the multiplex may need to start at a later address in the clip because partial access units may be present at the start and end of a clip. Presentation may need to start at an even later presentation unit A clip is not necessarily the longest extent of a stream that complies with its defining specification. Thus, a clip contains no discontinuous points or changes in basic MPEG coding parameters. When two clips are connected, there may be a discontinuity. Alternatively, it is possible that two clips can be joined with no discontinuity. When the memory application needs to know which of these two cases applies, for example, when the play back system needs to make a connection between two clips, it is indicated in the higher level control structures in the memory database.

Each clip is stored in its own real-time file. The physical allocation of the real-time file in memory (on disc) ensures a continuous supply of data for reading and writing. Parts of the data in a clip may be shared between two or more clips by using data sharing mechanisms defined in the file system. In general, in initial recording is made into a single clip, with the number of clips rising as edit operations are made.

Next the characteristic points and the characteristic point information (CPI) will be described. Reference is made in this respect to FIG. 2. In general, CPI is used to determine the location of relevant data elements in a clip, without having to read and parse the clip itself. This is important for several different system operations. Major examples of such operations are the following:

1. Trickplay operation, such as fast forward and fast reverse play. During high-speed forward or reverse play of a clip that contra video stream data, the stream cannot be read and decoded completely. Instead, only selected parts of the stream will be read and decoded. The selection of these parts is based on CPI. For this purpose, CPI includes e.g. characteristic points that indicate the location of I-picture data 2. Interactive playback. In case of interactive playback, the user may require playback to start at some particular time position in a clip, rather than at the beginning of the clip. In such a case, CPI is used to find the data locations for reading and decoding that match this time position. For this purpose CPI includes e.g. time-stamp values for relevant audio and video access units.

3. Quick edit-like operations involving clip truncation. The essential characteristic of this kind of operations is that they produce truncated versions of clips without actually touching any data in the clips themselves. Typically, these kinds of operations manipulate clip references to produce new clips with references to truncated versions of such clips. Possible examples are division of clips into smaller ones, creation of new clips using non-seamless edit connections etc. In all of these cases, CPI can be used to determine when truncated versions of the clip should start or end.

In order to be able to use CPI effectively, the total amount of CPI data should be limited. This allows all or most of the CPI data to be stored in system memory, so that there is no need to write or read CPI data to or from the disc during time-critical operations. Actual limitations might be either given based on the general format (in terms of points) or based on the specific format (in terms of the actual size of CPI data on the disc).

For each clip file, a list of all the points, which are belonging to that clip, should be present. For each clip file there is an accompanying CPI sequence, containing the specific point information of that clip file.

It is known, eg. from the above mentioned patent applications, that clip files can share data with other clip files.

In accordance with one aspect of the invention, CPI sequences can also share points with other CPI sequences. For each characteristic point several parameters are needed:

point_offset: This non-negative integer-valued parameter represents the offset in a section of the point in the clip. It represents the location of the point with byte precision.

point_type_id: This 7 bit valued parameter represents the type of the point. Such type ID can, as an example, indicate that the point corresponds to the start position of an I frame.

point_data: This parameter represents the data field that is associated with the point. The exact syntax and semantics of the data field depends on the type of the point and will be specified for each type separately. Point data could, as an example, be the presentation time well known in MPEG.

The type and the data of a characteristic point are inseparable with the accompanying point. If the point is shared by at least two CPI sequences, these parameters are the same in any CPI sequence containing that point concerned. However, because data of a CPI sequence can be shared by other CPI sequences, the location of a point in a clip can be different for each clip containing the same point. For this reason, the location of a point in a CPI sequence can not be represented by an absolute offset from the start of the clip file.

A clip file, containing a data stream, is considered to be divided in sections of 8 MB of information. Each section is labeled with a section_number, which will increment by one for consecutive sections. The section_number is stored in the accompanying CPI sequence, in which each point is labeled with an offset that points to the start of the section it is in, called section_offset. Note that the start of a clip can be in an arbitrary section with an arbitrary section_offset.

The playable object will contain the section_number and section_offset of the start of the clip file. The offset of the point in the clip file can be calculated as follows:

$$\text{point\_offset} = S \times (\text{section\_number}_{point} - \text{section\_number}_{SOF}) + (\text{section\_offset}_{point} - \text{section\_offset}_{SOF})$$

where:

$$S = \text{section size} \ (=2^{23} \text{bytes})$$

section_number$_{point}$=the number of the section in which the point is located section_number$_{SOF}$=the number of the first section of the clip file section_offset$_{point}$=the offset of the point in the section in which the point is located section_offset$_{SOF}$=the offset of the start of the clip file in the section in which the start of the file is located NOTE: For an average point distance of 16 kB, there will be an section_number for every 512 points.

Next the structure of a CPI sequence, which is a second aspect of the invention, will be explained with reference to FIG. 2. A CPI sequence is based on a 4-byte unit named quadlet. Quadlets are well known in the art, see the IEEE 1394-1995 Standard for high performance serial bus, par. 1.6.3 'Size notation'. In a CPI sequence, five types of quadlets can be present:

- section_number_quadlet (see (a) in FIG. 2): This quadlet contains the section_number and should be inserted when the value of the section_number increases. It is allowed to insert more than one section_number_quadlet for the same section. If a section contains no points, it is not mandatory to insert a section_number_quadlet.
- short_point_quadlet (see (b) in FIG. 2): This quadlet contains the section_offset and the point_type_id of a point. This quadlet is only used for points that don't have point_data.
- point_start_quadlet (see (c) and (d) in FIG. 2): This quadlet contains part of the point_data and the point_type_id of a point. This quadlet is only used for points that do have point_data.
- point_intermediate_quadlet (see (d) in FIG. 2): This quadlet contains part of the point_data. This quadlet is only used for points that do have point_data.
- point_end_quadlet (see (c) and (d) in FIG. 2). This quadlet contains the section_offset and part of the point_data of a point. This quadlet is only need for points that do have point_data.

The characteristic point identified by (c) in FIG. 2 is a point with four bytes of point_data, such as I_start, and comprises a point_start_quadlet and a point_end_quadlet. (d) in FIG. 2 shows an example of a characteristic point with seven bytes of point_data and comprises a point_start_quadlet, a point_intermediate_quadlet and a point_end_quadlet.

Below follows the syntax of a CPI sequence. The syntax as described below is in accordance with the rules as laid down in eg. ISO/IEC 13818-1, par. 2.2, 'Symbols and abbreviations' hereby incorporated herein in whole by reference.

| Syntax | No. of bits | Mnemonic |
|---|---|---|
| Cpi_sequence( ) { | | |
|   While (nextbits( )=='xxxxxxxx xxxxxxxx xxxxxxxx xxxxxxxx') | | |
|   { | | |
|     if (nextbits( )=='1xxxxxxx xxxxxxxx xxxxxxxx xxxxxxxx') | | |
|     { | | |
|       point_start_quadlet( ) | | |
|       while (nextbits( )=='1xxxxxxx xxxxxxxx xxxxxxxx xxxxxxxx') { | | |
|         point_intermediate_quadlet( ) | | |
|       } | | |
|       point_end_quadlet( ) | | |
|     } else | | |
|     if (nextbits( )=='0xxxxxxx xxxxxxxx xxxxxxxx 1xxxxxxx') | | |
|       short_point_quadlet( ) | | |
|     else | | |
|       section_number_quadlet( ) | | |
|   } | | |
| } | | |

| Syntax | No. of bits | Mnemonic |
|---|---|---|
| point_start_quadlet( ){ | | |
|   '1' | 1 | bslbf |
|   Point_type_id | 7 | uimsbf |
|   for(I=0; i < 3; I++) { | | |
|     Point_data_byte | 8 | bslbf |
|   } | | |
| } | | |

| Syntax | No. of bits | Mnemonic |
|---|---|---|
| point_intermediate_quadlet( ){ | | |
|   '1' | 1 | bslbf |
|   Reserved | 7 | bslbf |
|   for (I = 0; i < 3; I++) { | | |
|     Point_data_byte | 8 | bslbf |
|   } | | |
| } | | |

| Syntax | No. of bits | Mnemonic |
|---|---|---|
| point_data_quadlet( ){ | | |
|   '0' | 1 | bslbf |
|   Section_offset | 23 | bslbf |
|   Point_data_byte | 8 | bslbf |
| } | | |

| Syntax | No. of bits | Mnemonic |
|---|---|---|
| short_point_quadlet( ){ | | |
|   '0' | 1 | bslbf |
|   Section_offset | 23 | bslbf |
|   '1' | 1 | bslbf |
|   Point_type_id | 7 | uimsbf |
| } | | |

| Syntax | No. of bits | Mnemonic |
|---|---|---|
| Section_number_quadlet( ){ | | |
|   '0' | 1 | bslbf |
|   Section_number | 23 | bslbf |
|   '0' | 1 | bslbf |
|   Reserved | 7 | bslbf |
| } | | |

Next follows the semantics of the CPI sequence:

point type_id: The type_id of the point.

section_number: The number of the section in which the point is located.

section_offset: The offset of the point in the section in which the point is located.
point_data_byte: Data bytes shall be contiguous bytes of the point_data.

A point that has point_data consists of a point_start_quadlet, zero or more amount of point_data of one $$\begin{cases} 0 \\ 4 + 3n, \end{cases}$$

point_intermediate_quadlets and a point_end_quadlet. The CPI syntax allows the following possibilities for the total amount of point_data per point:

It should be noted here, that, for fast searching in a CPI sequence, e.g. time code search, one can jump to an estimated place in the CPI sequence, parsing the data for a section_number_quadlet and subsequently an I_start point.

In general, a clip contains a multiplex consisting of several elementary streams. The multiplex type of the clip can be preferred from its so-called multiplex attributes. In addition, each individual elementary stream can be identified and its type can be inferred from its so-called stream attributes.

Each different elementary stream in the multiplex may have its own set of characteristic points. These points and their point types are uniquely identified using their point_type_id in the CPI syntax. From the point_type_id of a point, both the elementary stream to which it belongs and the point type of the point can be inferred.

The semantics and usage of a given point type depends on the stream type of the elementary stream, and its use may even depend on the multiplex type and/or other properties of the multiplex stream. For this reason, the specification of characteristic points in this chapter is structured in separate sections that refer to the multiplex and sections that refer to the elementary streams such as audio, video, graphics etc.

In the succeeding part of this description, there is a specification of characteristic points for each elementary stream type. (Stream types for which no characteristic points are defined have been omitted.) Each such specification consists of three parts:
1. General definition of point types (for the given stream type).
2. Description of general rules for the use of the different point types. In general, these rules specify the occurrence of points, not only for each point type individually, but also in combination.
3. Specifications of the point parameters (point_offset, and point_data), for each point type in a separate subsection.

For an MPEG-2 video stream of native format, the following point types are defined: I_start, I_end, P1_end, P2_end. They are used to indicate the locations of relevant coded I-frames and coded P-frames in the video stream.
Note: "coded I-fame" and "coded P-fame" are defined as in ISO/IEC 13818-2 hereby incorporated herein in whole by reference.

I_start and I_end points are used to indicate the location of the first coded I-frame in a GOP (group of pictures). The occurrence of these point types is governed by the following rules:
V1. I_start and I_end points shall occur in pairs, each pair referring to the start and end of the same coded I-frame. More precisely: for every: I_start point (indicating the start of a coded I-frame) there shall be an I_end point that represents the end of the same coded I-frame, except if the coded I-frame data has been truncated at the end of the clip. Conversely, for every I_end point (indicating the end of a coded I-frame) there shall be an I_start point that represents the start of the same coded I-frame, except if the coded I-frame data has been truncated at the start of the clip.
V2. There is no obligation to have I_start and I_end points for every GOP.

In general, the amount of I_start and I_end points has to be limited because of the constraints on the total amount of CPI data. For example, in case of low bitrates and/or small GOP sizes, it may not be possible to have an I-start and I-end point for every GOP. In such cases, it is recommended to select as many coded I-frames as possible (i.e. select as many GOPs as possible), but in such a way that the selected coded I-frames correspond with a more or less regular temporal subsampling of pictures in the stream.

An I_start point is located at the start of the first I-picture access unit in the GOP. Its point data contains the presentation time of the I-picture.
Note: The I-picture access unit starts with the first byte of the sequence_header_code that precedes the group of pictures header and the picture start code;
point_offset: The value of this parameter shall equal the offset of the first byte of the I-picture access unit (as defined above) in the clip.
point_data: This parameter is defined by the following syntax and semantics:
Name Bits Type

| Name | Bits | Type |
| --- | --- | --- |
| Presentation_time | 32 | uimsbf | presentation_time: A 32-bit time-stamp value representing the presentation time of the I-picture. The value of this field corresponds to the 32 least significant bits of the 33-bit PTS of the I-picture in the stream.
Note: the above 32-bit time-stamp value may wrap around within a Clip An I_end point is located at the end of the coded I-frame indicated by an I-start point. It has no point data.
Note: The coded I-frame is the first coded I-frame of a GOP.
point_offset: The value of this parameter shall equal the offset of the last byte of the coded I-frame (as defined above) in the clip.
point_data: This parameter is empty (i.e. there shall be no point data).

Figure 3:
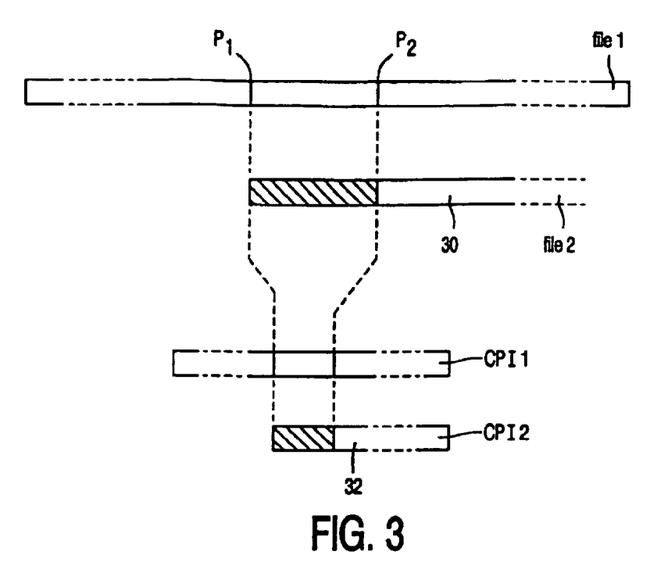
FIGS. 3 and 4 show the sharing of data in clip files and in corresponding CPI sequences.

FIG. 3 shows in more detail the sharing of data of information (clip) files and the sharing of data of the corresponding CPI sequences. FIG. 3 shows an information file, file 1, on which an editing step will be carried out. The file has a corresponding CPI sequence, CPI1. In the edit step, a new information file will be formed, denoted file 2 in FIG. 3, as well as a corresponding CPI sequence, CPI2, corresponding to that file. The editing step, in this specific example, results in a second file that starts with a portion of the first file, file 1, lying between the points P1 and P2 (somewhere in the middle) in file 1. This is identified by the hatched portion in the file 2. Another portion, taken from another file, or newly added in the edit step, identified by the reference numeral 30, follows this hatched portion, a can be seen in FIG. 3, so as to form the file 2. The files 1 and 2 have the portion between the points P1 and P2 in common. This means that the information corresponding to this portion is stored only once on the record carrier and will be reproduced when reproducing the file 1 or when reproducing the file 2.

Creating the CPI sequence for the file 2, means that that portion of the CPI sequence CPI1, that corresponds to the portion in the information file 1 between the points P1 and P2 is used as the first portion of the CPI sequence CPI2, see the hatched portion in CPI2 in FIG. 3. In other words, the CPI sequences CPI1 and CPI2 have the characteristic point information corresponding to the portion between the points P1 and P2 in common. This means that the CPI information corresponding to this portion is stored only once on the record carrier and will be used in CPI1, when reproducing the file 1, and will be used in CPI2, when reproducing the file 2.

Figure 4:
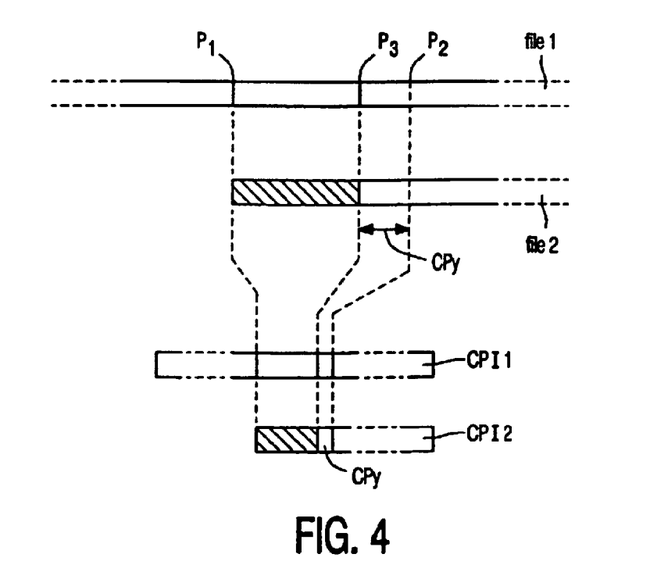

FIG. 4 shows another example of sharing data by files. In the example of FIG. 4, it is assumed that, when reproducing either the file 1 or the file 2, the portion between the points P1 and P2 is the same information signal. This could have been realized in an editing step in which editing results in sharing the portion between the points P1 and P3 and copying the portion between the points P3 and P2. Now, the hatched portion in the file of FIG. 4, which is common with the portion between the points P1 and P3 in the file 1, is stored only once on the record carrier. The portion in the file 2, denoted cpy, is a copy of the corresponding portion between the points P3 and P2 in the file 1. This portion is now stored twice on the record carrier, once for the file 1 and once for the file 2.

In the same way, the hatched portion in CPI2 of FIG. 4, which is common with the portion between the points P1 and P3 in CPI1, is stored only once on the record carrier. The portion in CPI 2, denoted cpy, is a copy of the corresponding portion between the points P3 and P2 in CPI 1. This portion is now stored twice on the record carrier, one for CPI 1 and once for CPI 2.

Figure 5:
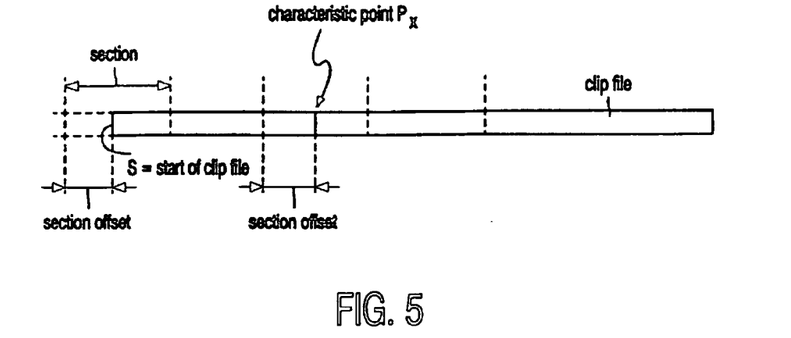
FIG. 5 shows a clip file, built up from a sequence of sections of information.

FIG. 5 shows how a clip file built up of a sequence of sections of information. The clip file has been stored in the memory, such as on a DVR disc. The sections of length 8 MB have portions of information of the clip file stored in them. It should be noted here, that the sections defined above need not necessarily be the same as the segments described in U.S. patent application Ser. No. 09/266,329 filed Mar. 11, 1999 by Saeijs et al. If not, the division of the information file in sections is then done on a higher (system) level.

The start position of the clip file need not coincide with the start of a section. The characteristic point identifying the start position of the clip file is identified by a point in the CPI sequence with the format as shown in (c) of figure 2, to indicate the relative offset of the start position from the start of the section. This point is preceded by a point in the CPI sequence with the format as shown in (a) of FIG. 2, to indicate the section in which the start position is located.

Each characteristic point in the file, such as the point Px in FIG. 4, is also identified by a point in the CPI sequence, with the format as shown in (c) or (d) of FIG. 2.

Figure 6:
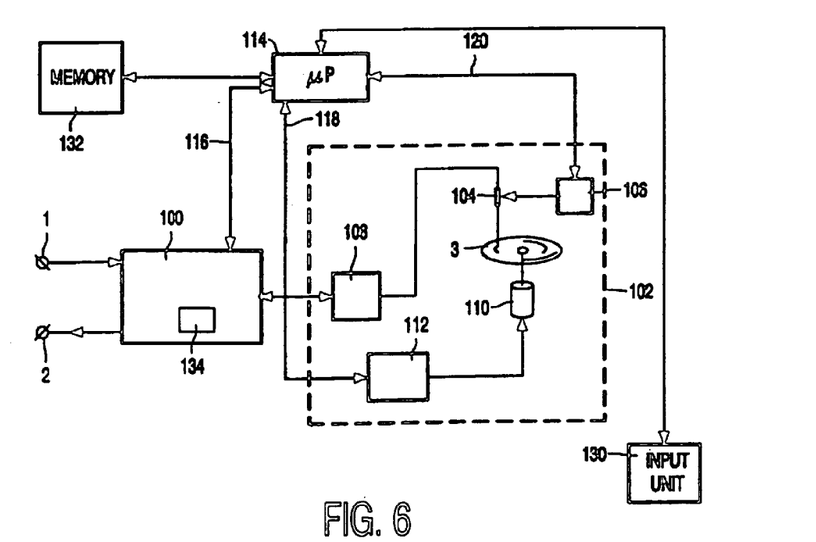
FIG. 6 shows an embodiment of the apparatus in accordance with the invention.

FIG. 6 shows an embodiment of the apparatus in accordance with the invention. The apparatus comprises an input terminal 1 for receiving an information signal and a signal processing unit 100. The signal processing unit 100 receives the video information signal via the input terminal 1 and processes the video information into an information file for recording the information file on the disc like record carrier 3. Further, a read/write unit 102 is available. The read/write unit 102 comprises a read/write head 104, which is in the present example an optical read/write head for reading/writing the information file on/from the record carrier 3. Further, positioning apparatus 106 are present for positioning the head 104 in a radial direction across the record carrier 3. A read/write amplifier 108 is present in order to amplify the signal to be recorded and amplifying the signal read from the record carrier 3. A motor 110 is available for rotating the record carrier 3 in response to a motor control signal supplied by a motor control signal generator unit 112. A microprocessor 114 is present for controlling all the circuits via control lines 116, 118 and 120.

The signal processing unit 100 is adapted to convert the information signal into an information file. The information file is in the form of a sequence of sections comprising blocks of information of the information file having a specific size. The sections have a section number, generated by the processing unit 100. The processing unit 100 is further adapted to generate a CPI sequence for the information file. To that purpose, the processing unit is, as an example, capable of identifying the start and end positions of an I-frame in the information file and for generating a block of information for the CPI sequence, as shown in (e) of FIG. 2. That means that the processing unit 100 is capable of establishing the section offset, which is representative of the distance between a characteristic point and the start of a section, as described above with reference to FIG. 5. Further, when the processing unit detects a characteristic point lying in a section, it generates a block of information for the CPI sequence, as shown in (a) of FIG. 2.

The CPI information can be temporarily stored in a memory 132, until the processing of the information signal into the information file (and eventually the subsequent recording on the record carrier 3) has been completed. Next, the CPI information stored in the memory 132 can be recorded on the record carrier 3.

In order to enable editing of an information signal recorded in an earlier recording step on the record carrier 3, the apparatus is further provided with an input unit 130 for receiving edit commands from a user. Such edit commands can be in the form of edit commands identifying the positions P1 and P2 (and P3) as shown in the FIGS. 3 and 4. Suppose that the user has the wish to make a new information file, file 2 as shown in FIG. 3, where the first portion of the file 2 equals the portion of the file 1 between the points P1 and P2, and where the first remaining portion of the file 2, identified by 30 in FIG. 3, is obtained from inputting a second information signal via the input terminal 1. In response thereto, the processing unit 100 is capable of generating a new CPI sequence, by detecting the characteristic points in the second signal received via the input terminal 1 and generating corresponding blocks of information, with one of the formats given in FIG. 2. Further, the second information signal supplied to the input 1 is processed into the portion 30 of the information file 2 and stored on the record carrier 3. The first (hatched) portion of the file 2 is not recorded (again) on the record carrier, for the reason that it is already present on the record carrier as a part of the file 1.

Generation of the CPI sequence CPI2 will now be realized as follows. Only the CPI information obtained from the second information signal supplied to the input terminal 1, identified by the portion 32 of the CPI sequence CPI2 in FIG. 3, is stored on the record carrier 3. The first (hatched) portion of CPI2 is not recorded (again) on the record carrier, for the reason that it is already present on the record carrier as a part of the CPI1.

Further, on a higher system level, information is generated and stored in eg. the memory unit 132, to 'couple', upon reproduction, the CPI information stored on various locations on the record carrier, in order to create the complete CPI sequence CPI2.

In a further aspect of the invention, the generation of CPI sequences can be realized on information files already recorded on the record carrier, but for which no CPI1 sequence has been generated yet. Such application is to be expected in eg. PC applications, where the information file has already been stored without any CPI sequence belonging to it.

Whilst the invention has been described with reference to preferred embodiments thereof, it is to be understood that these are not limitative examples. Thus, various modifications may become apparent to those skilled in the art, without departing from the scope of the invention, as defined by the claims. Further, the invention lies in each and every novel feature or combination of features

What is claimed is:

1. An apparatus comprising:

input means for receiving a digital information signal;

processing means for processing the digital information signal into an information file including a sequence of sections including fixed size portions of information;

writing means for writing the information file on a record carrier;

means for generating characteristic point information, the characteristic point information identifying a characteristic point in the information file;

means for processing the characteristic point information for a plurality of characteristic points into a characteristic point information (CPI) sequence including for a characteristic point, a block of information including section offset information identifying the position of the characteristic point in the section of the information file in which the characteristic point is located; and means for recording the characteristic point information sequence on the record carrier, wherein the blocks of information in the CPI sequence have lengths of one or more quadlets; and wherein, if a block of information has only one quadlet, then a first bit in the quadlet is a bit of a first binary type, and if the block of information has more than one quadlet, then the first bit of the first quadlet is a bit of a second binary type and the first bit of the last quadlet is a bit of the first binary type.

2. The apparatus as claimed in claimed 1, wherein, if a block of information has n quadlets, where n>2, then the first bit of the second to the (n−2)-th quadlets is a bit of the second binary type.

3. The apparatus as claimed in claim 1, wherein the block of information includes data having a relationship with the characteristic point.

4. The apparatus as claimed in claim 1, wherein the block of information includes data having a relationship with the type of the characteristic point.

5. The apparatus as claimed in claim 4, wherein the block of information in the CPI sequence has a length of one quadlet.

6. The apparatus as claimed in claim 3, wherein the relationship with the characteristic point includes a presentation time stamp corresponding to that point.

7. The apparatus as claimed in claim 4, wherein the relationship with the type of the characteristic point includes that the point is the start point or end point of an I-frame in the information file.

8. An apparatus comprising:

input means for receiving a digital information signal;

processing means for processing the digital information signal into an information file including a sequence of sections including fixed size portions of information;

writing means for writing the information file on a record carrier;

means for generating characteristic point information, the characteristic point information identifying a characteristic point in the information file;

means for processing the characteristic point information for a plurality of characteristic points into a characteristic point information (CPI) sequence including for a characteristic point, a block of information including section offset information identifying the position of the characteristic point in the section of the information file in which the characteristic point is located; and means for recording the characteristic point information sequence on the record carrier, wherein the block of information includes data having a relationship with the type of the characteristic point;

wherein the block of information in the CPI sequence has a length of one quadlet; and wherein the first bit in the quadlet is followed by the section number information.

\* \* \* \* \*